(12) United States Patent
Kydd

(10) Patent No.: US 7,103,903 B1
(45) Date of Patent: *Sep. 5, 2006

(54) INTERACTIVE TELEVISION BROADCAST SYSTEM

(75) Inventor: Richard Andrew Kydd, Middlesex (GB)

(73) Assignee: Two Way Media Limited, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/569,152

(22) Filed: May 11, 2000

(51) Int. Cl.
H04H 9/00 (2006.01)
H04N 7/16 (2006.01)

(52) U.S. Cl. .............. 725/9; 725/14; 725/20; 725/110; 725/112

(58) Field of Classification Search .......... 725/9–21, 725/37, 38, 39, 51, 78, 114–115, 121, 110, 725/112; 455/2.01; 709/217, 246
See application file for complete search history.

(56) References Cited

U.S. PATENT DOCUMENTS

| 4,230,990 | A | * | 10/1980 | Lert et al. ............ 725/22 |
| 5,374,951 | A | * | 12/1994 | Welsh |
| 5,734,720 | A | | 3/1998 | Salganicoff |
| 5,752,160 | A | * | 5/1998 | Dunn ................ 455/5.1 |
| 5,778,181 | A | | 7/1998 | Hidary et al. |
| 5,857,190 | A | * | 1/1999 | Brown ................ 707/10 |
| 5,889,950 | A | * | 3/1999 | Kuzma |
| 5,907,322 | A | * | 5/1999 | Kelly et al. ............ 345/327 |
| 6,035,304 | A | * | 3/2000 | Machida et al. ........ 707/104 |
| 6,163,316 | A | * | 12/2000 | Killian ............... 345/327 |
| 6,202,210 | B1 | * | 3/2001 | Ludtke |
| 6,530,082 | B1 | * | 3/2003 | Del Sesto et al. ........ 725/9 |
| 6,938,270 | B1 | * | 8/2005 | Blackketter et al. ...... 725/112 |
| 2002/0010919 | A1 | * | 1/2002 | Lu et al. |

FOREIGN PATENT DOCUMENTS

| EP | 0 854 645 A2 | 7/1998 |
| NZ | 235927 | 3/1994 |
| NZ | 292624 | 5/1997 |
| NZ | 259776 | 6/1997 |
| WO | WO 00/16552 | 3/2000 |

* cited by examiner

Primary Examiner—Ngoc Vu

(57) ABSTRACT

An interactive television broadcast system comprises a source for broadcasting a plurality of television channels and data. A plurality of remote receiving units, each include a tuner to enable the unit to be tuned to receive a selected TV channel broadcast by the source, a processor responsive to data received from the source to determine the channel to which the unit is tuned, and a transmitter for sending information relating to the channel to which the unit is tuned to a common data collector.

12 Claims, 1 Drawing Sheet

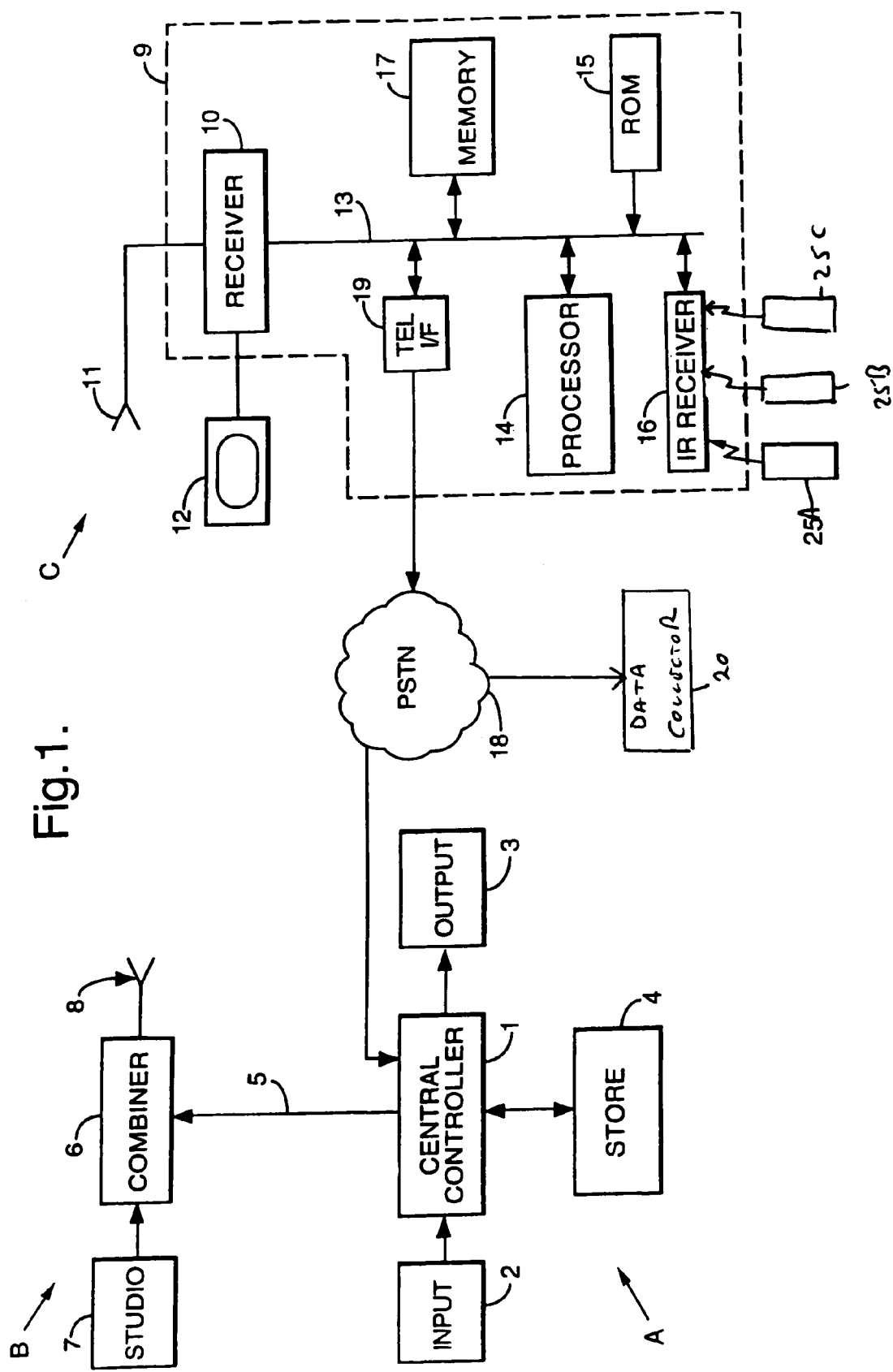

INTERACTIVE TELEVISION BROADCAST SYSTEM

FIELD OF THE INVENTION

The invention relates to an interactive television broadcast system and to a remote receiving unit for use in such a system.

DESCRIPTION OF THE PRIOR ART

Interactive television broadcast systems have been developed to enable remote users to play interactive games, take part in business transactions, bet on broadcast sports events and the like. In many cases, the interactive application relates to a television program which is being broadcast simultaneously. Although such systems have been developed based on analogue techniques, the recent introduction of digital TV networks substantially increases the range and sophistication of applications which are offered.

Television broadcasters and interactive application providers need to obtain accurate viewing figures. Historically, viewing figures have been based on small statistical samples which have either been obtained by physical interview with viewers, the returning of questionnaires by viewers, or in some cases installation of special equipment in a small number of homes to gather the information. The use of a small number of samples is not accurate as it does not represent the actual viewing population but the provision of special equipment to every viewer is undesirable.

SUMMARY OF THE INVENTION

In accordance with the present invention, an interactive television broadcast system comprises a source for broadcasting a plurality of television channels and data; and a plurality of remote receiving units, each unit including a tuner to enable the unit to be tuned to receive a selected TV channel broadcast by the source, a processor responsive to data received from the source to determine the channel to which the unit is tuned, and a transmitter for sending information relating to the channel to which the unit is tuned to a common data collector.

We have realised that it is possible to utilize the remote receiving units which are already needed for handling interactive applications so as also to provide viewing figure information. Since every location which takes part in an interactive application must have its own remote receiving unit, it is possible quickly to provide without any additional user intervention a very accurate measure of actual viewing figures by using these remote receiving units. The method has a much faster turnaround time than previously and provides figures representative of the actual population. It is also possible to monitor in-break user responses, for example to determine how many people are watching a specific advertisement and if they change channels during an advertising break.

There are a variety of ways in which the system can be implemented within the remote receiving units. In one case, each unit includes a program store for storing a program which when implemented by the processor causes the processor to determine the channel to which the unit is tuned. The program could have been provided on installation of the remote receiving unit or it might be downloaded at a later time. In any event, in this case, the source simply needs to transmit a trigger signal to cause the program to be implemented. The trigger signal could typically be broadcast to all remote receiving units in real time by the source operator. Although in other cases the trigger could be activated at predetermined times. In the latter case, the trigger signal could be transmitted at those predetermined times from the source or alternatively the source could supply information defining the predetermined time to each remote receiving unit where it is stored, the local processor then carrying out the channel determination when the local time is the same as the stored time.

In another example, the processor is programmed to respond to a URL (uniform resource locator) sent by the source, the processor using the URL to access via the Internet a program to which it responds to determine the channel to which the unit is tuned. This approach uses an Internet based system in which the processor accesses a web page defined by the URL, the web page holding program code or other data which causes the local processor to determine the channel information.

The advantage of this approach is that mechanisms have already been proposed by standards bodies such as ATVEF (Advanced TV Enhancements Forum) for broadcasting URL triggers to remote receiving units. In these proposals, however, the triggers have been used automatically to load graphical applications and the like to enhance the TV broadcast.

A further advantage of the invention is that when used in connection with interactive advertising applications, it is possible to determine not only the number of viewers who respond to advertisements (as is already carried out), but also the total number of actual viewers of the advertisement.

In a further example, the source is adapted to transmit data in the form of a program to which the processor responds to determine the channel to which the unit is tuned. In this case, the source broadcasts the program data on each occasion on which it requires channel viewing information either for immediate activation by the processor or for activation at a future, predetermined time.

As explained above, usually each processor will respond to the data from the source in real time but it is also possible for the processor to respond after a time interval (for example at a predetermined time) and of course the data obtained can either be transmitted immediately to the common data collector or stored for later transmission.

The information may include one or more of
a) the channel to which the unit is currently tuned;
b) the duration for which the unit is actively tuned to a channel;
c) the identity of the unit; and
d) the identity of a user of the unit.

The invention is applicable to any form of transmission network and to systems which broadcast over more than one type of network. In addition, the invention is applicable to broadcast and transmission over the Internet.

Each transmitter is either permanently connected or connectable to a transmission medium which may be selected from one or more of terrestrial, cable, satellite, public switched telephone network (PSTN), or the Internet.

The transmitter may transmit over the same or a different network to that from which the TV broadcast and data is received from the source.

The common data collector may be positioned at the same location of the source although this is not necessary and the returned information can be addressed to another location on the network that is used.

The remote receiving unit may be implemented as a set top box or integrated into a television set.

BRIEF DESCRIPTION OF THE DRAWING

An example of an interactive television broadcast system according to the invention will now be described with reference to the accompanying drawing, in which:—

FIG. 1 is a schematic diagram of the system.

DETAILED DESCRIPTION OF THE EMBODIMENT

The interactive TV broadcast system shown in FIG. 1 comprises a game control system A at a central site and including a central controller 1 which will include a computer such as a PC operating a Windows based system, connected to an input device 2 such as a keyboard and/or mouse and the like and to an output device 3 which may include a monitor and/or printer. A store 4 contains a database storing data relating to service functions and remote users, which can be accessed and amended by the central controller 1, and a Live File store storing application data relating to the game (i.e. application) being or to be broadcast. The central controller 1 generates data which can be converted to TV display signals and other control signals associated with various service functions, on a land line 5 connected to a combining unit 6 defining an insertion point of a TV broadcast source B. The combining unit 6 receives television broadcast signals from a studio 7 (or outside broadcast (OB) location, in the case of a live event), and combines these with the signals on the line 5 so that they are transmitted simultaneously by a transmitter 8 to remote users or players C. In other applications, the signals from the central controller 1 and the studio or OB 7 will be transmitted separately.

The signals applied to the combiner 6 may be transmitted to the remote units within a vertical blanking interval (VBI) of the normal TV signal or on a separate radio FM-SCA channel or other data format such as a cable modem, satellite or the Internet. Typically, the transmitted signals will be in digital form but the invention is also applicable to analogue signals.

Each remote user C has a home or remote receiving unit 9 formed by a Set Top Box (STB) having a tunable television receiver 10 connected to an aerial 11 and a monitor 12. The home unit 9 includes an address/database bus 13 connected to the receiver 10, the bus 13 being connected to a microprocessor 14, a memory 15, such as a ROM, storing program instructions for the processor 14, an infra-red receiver 16, and a memory (RAM) 17. Signals transmitted by the processor 14 can be communicated to the central controller 1 or to a data collector 20 via a PSTN 18 which is selectively accessed by a telephone interface unit 19 connected to the bus 13.

Alternative media such as cable or the Internet can be used for the return signals (as for the signals transmitted to the remote unit C). In general the return signals will be transmitted over a different medium than the incoming signals.

The game control system A can be used to control a variety of games including interactive, predictive games and two examples of such interactive, predictive games are described in EP-A-0873772 incorporated herein by reference. In the first example, PlayLive® Football, the remote players are able to attempt to predict certain events prior to commencement of a live football match which is broadcast by the transmitter 8 and can also attempt to predict certain events during the live broadcast. In the second example, a predictive game for use with broadcast horse racing is described.

In order to enable user to communicate with the set top box (STB) 9, each user has a handset 25A, 25B, 25C which is physically separate from the STB 9 but can communicate with the IR receiver 16 of the STB 9 via signals generated in the infra-red waveband. The IR receiver 16 then converts those signals for supply to the processor 14 along the data bus 13. This is described in more detail in EP-A-0921657 incorporated herein by reference.

In use, the remote user uses his handset 25A–25C to select a channel which he wishes to view, the processor 14 responding to the selection causes the receiver 10 to tune to the appropriate channel. In addition, the user can use the handset 25A–25C to select an interactive application such as a game which he can play simultaneously with the television broadcast.

In the preferred embodiment, the ROM 15 stores program data allowing the processor 14 to act as a Java Script handler. When the system operator wishes to obtain information relating to viewing figures, he causes the central controller 1 to issue an "Announcement Message" which is broadcast by the combiner 6 to all STBs 9. The Announcement Message contains a URL link to which the processor 14 in each STB 9 can respond. The use of Announcement Messages containing URL links is already known and is conventionally used to enable the processor 14 to access one or more web pages the contents of which are then downloaded for display. Conventionally this has been used to enable a viewer to see additional information relating to a television program which he is currently watching and to which the receiver is tuned. Thus, the Announcement Message contains information defining the channel to which it relates and a URL. In some cases, the Announcement Message is implemented immediately. In other cases, however, the Announcement Message will contain a start time so that it can be acted upon at a future time or it may contain a duration (or finish) time allowing the announcement message to be acted upon at any time during that duration, or a start time and a duration time. This latter feature means that if the user switches to the channel to which the Announcement Message relates while the duration period is still active, then the appropriate URL link will be acted upon.

In this embodiment of the present invention, the URL contained in the Announcement Message links to an in-band "hidden viewing figures capture page". This page contains code which when downloaded to the processor 14 causes the processor to capture viewing information (current channel, current time, subscriber name etc.) and then to return the information to the data collector 20.

When the Announcement Message is received (in the case of a real time or live Announcement Message) or when the start time of a received Announcement Message is reached, and if the receiver 10 is tuned to the correct channel, the processor 14 will respond to the Announcement Message by accessing the hidden page. Rather than causing a display on the monitor 12, the content of the hidden page will be downloaded causing the processor 14 to generate a message relating to viewing information which is transmitted via the interface 19 to the data collector 20.

As mentioned above, other methods could be used for obtaining the viewing figures. For example, messages which are not internet based in format could be used to trigger the activation of a program in the ROM 15 which also determines the channel to which the receiver 10 is tuned. That program could have been sent via an earlier broadcast, loaded locally, or supplied already loaded in the STB 9.

At a minimum, the methods described above will monitor the channel to which the receiver 10 is tuned, whether or not the television 12 itself is switched on or off. This will be acceptable in many cases where viewers will switch off the STB 9 when they are not viewing. The processor 14; can easily determine whether or not the STB 9 is switched on or off. If it is possible for the STB 9 to be left on while the televison 12 is switched off, then the processor 14 can be programmed to monitor activity of users, for example, the length of time since the last command was issued by a handset 25A–25C. If this time exceeds a pre-determined threshold, then the processor 14 will assume that the channel is no longer being viewed.

In other cases, the television 12 may be switched on/off via the STB 9, in which case the processor 14 can monitor the on/off control signals.

In a more sophisticated approach, signals from individual handsets 25A–25C could be individually monitored so that the processor 14 can return data to the data collector 20 indicating specific user's viewing habits.

I claim:

1. An interactive television broadcast system comprising:
   a source at a first location for broadcasting a plurality of television channels and trigger data;
   a common data collector;
   a plurality of remote receiving units, each unit at a location other than the first location, each unit including a tuner to enable the unit to be tuned to receive the trigger data and a selected TV channel broadcast by the source, wherein each unit comprises:
   a processor adapted to selectively execute a program in response to receipt of the trigger data, causing the processor to monitor the unit so as to monitor the channel to which the unit is tuned and to generate corresponding monitored information; and
   a transmitter for sending the monitored information relating to the channel to which the unit is tuned to the common data collector, wherein each unit is provided with the program separately and prior to the receipt of the trigger data.

2. A system according to claim 1, wherein each unit includes a program store for storing the program which when executed by the processor causes the processor to monitor the channel to which the unit is tuned.

3. A system according to claim 1, wherein the processor is adapted to respond to the trigger data from the source in real time.

4. A system according to claim 1, wherein the source is adapted to transmit the TV broadcast and data over one or more of a terrestrial, cable, satellite network or the internet.

5. A system according to claim 1, wherein the transmitter is connected or connectable to a transmission medium selected from one or more of terrestrial, cable, satellite, PSTN networks or the internet.

6. A system according to claim 1, wherein the transmitter is connected or connectable to the same network as that over which the unit received the TV broadcast and data from the source.

7. A system according to claim 1, wherein the processor is adapted to implement a plurality of interactive applications received from the source.

8. A system according to claim 1, wherein the common data collector is positioned at the first location.

9. A system according to claim 1, wherein the monitored information includes one or more of
   a. the channel to which the unit is currently tuned;
   b. the duration for which the unit is actively tuned to a channel;
   c. the identity of the unit; and
   d. the identity of a user of the unit.

10. A system according to claim 1, wherein the monitored information is viewing information such as the current channel, current time, or subscriber name.

11. A system according to claim 1, wherein the source is adapted to transmit the program as program data prior to the transmission of the trigger data.

12. A remote receiving unit for use in an interactive TV broadcast system having a source for broadcasting a plurality of television channels and trigger data, a common data collector and a plurality of remote receiving units, each unit comprising:
    a tuner to enable the unit to be tuned to receive the trigger data and a selected TV channel broadcast by the source;
    a processor adapted to selectively execute a program in response to receipt of the trigger data, causing the processor to monitor the remote receiving unit so as to monitor the channel to which the unit is tuned and to generate corresponding monitored information; and
    a transmitter for sending the monitored information relating to the channel to which the unit is tuned to a a common data collector, wherein the program to be executed by the processor is provided separately and prior to the receipt of the trigger data.

* * * * *